United States Patent
Coleman et al.

(10) Patent No.: US 10,027,705 B1
(45) Date of Patent: *Jul. 17, 2018

(54) APPARATUSES, METHODS AND SYSTEMS FOR A REAL-TIME CYBER THREAT INDICATOR VERIFICATION MECHANISM

(71) Applicant: Lookingglass Cyber Solutions, Inc., Baltimore, MD (US)

(72) Inventors: Christopher D. Coleman, Centreville, VA (US); Allan Thomson, Pleasanton, CA (US); Jason A. Lewis, Baltimore, MD (US)

(73) Assignee: Lookingglass Cyber Solutions, Inc., Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/457,403

(22) Filed: Mar. 13, 2017

Related U.S. Application Data

(63) Continuation of application No. 14/339,438, filed on Jul. 23, 2014, now Pat. No. 9,596,266.

(51) Int. Cl.
*G06F 11/00* (2006.01)
*H04L 29/06* (2006.01)

(52) U.S. Cl.
CPC .................. *H04L 63/145* (2013.01)

(58) Field of Classification Search
CPC ............... H04L 63/145; H04L 63/1416; H04L 63/1408; H04L 63/1491
See application file for complete search history.

(56) References Cited

U.S. PATENT DOCUMENTS

| | | | | |
|---|---|---|---|---|
| 8,806,646 B1* | 8/2014 | Daswani | ............. | H04L 63/1425 713/161 |
| 9,003,517 B2* | 4/2015 | Malhotra | ................ | G06F 21/53 713/165 |
| 2009/0307769 A1* | 12/2009 | Curnyn | ................ | G06F 21/566 726/22 |
| 2012/0304244 A1* | 11/2012 | Xie | ........................ | G06F 21/00 726/1 |

* cited by examiner

*Primary Examiner* — Ali Abyaneh
(74) *Attorney, Agent, or Firm* — Cooley LLP

(57) ABSTRACT

The real-time cyber threat indicator verification mechanism technology (hereinafter "TIVM") instantiates one or more virtual client emulators to access a source of a threat, in response to a received threat indicator, so as to evaluate validity and/or severity of the potential threat. In one embodiment, the TIVM may receive a cyber threat indicator having identifying information of a cyber threat source; instantiate, in response to the cyber threat indicator, a virtual client emulator; send a control message to cause the virtual client emulator to interact with the cyber threat source based on the identifying information; obtain a confidence indicator relating to the cyber threat indicator based on interaction between the virtual client emulator and the cyber threat source; and generate a cyber threat indicator confirmation report including the confidence indicator.

23 Claims, 7 Drawing Sheets

APPARATUSES, METHODS AND SYSTEMS FOR A REAL-TIME CYBER THREAT INDICATOR VERIFICATION MECHANISM

CROSS-REFERENCE TO RELATED APPLICATION

This application is a Continuation of, and claims priority to and the benefit of, U.S. Pat. No. 9,596,266, issued Mar. 14, 2017 and titled "APPARATUSES, METHODS AND SYSTEMS FOR A REAL-TIME CYBER THREAT INDICATOR VERIFICATION MECHANISM," the entire contents of which are herein expressly incorporated by reference.

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

Some embodiments described herein generally relate to apparatuses, methods, and systems for a cyber threat management mechanism, and more particularly, relate to a real-time cyber threat indicator verification mechanism ("TIVM").

BACKGROUND

Computer malware is a type of software that disrupts the normal operation of a computer. A malware instance can send malicious code programs to a computer so as to burden the processing capacity of the computer, gain access to secured data without authorization, or modify critical system settings. Anti-malware programs are designed to detect potential threats of malware.

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

SUMMARY

In one embodiment, the real-time cyber threat indicator verification mechanism technology (hereinafter "TIVM") may receive, from a host computer, a cyber threat indicator having identifying information of a cyber threat source; instantiate, in response to the cyber threat indicator, a virtual client emulator; send a control message to cause the virtual client emulator to interact with the cyber threat source based on the identifying information; obtain a confidence indicator relating to the cyber threat indicator based on interaction between the virtual client emulator and the cyber threat source; and generate a cyber threat indicator confirmation report including the confidence indicator.

DETAILED DESCRIPTION

In some embodiments, a real-time cyber threat indicator verification mechanism technology (hereinafter "TIVM") instantiates one or more virtual client emulators to access a source of a threat, in response to a received threat indicator, so as to evaluate validity and/or severity of the potential threat.

For example, a threat indicator (or an indicator of risk (IoR), as used interchangeably throughout the application) can provide basic context around a cyber threat, and/or behaviors observed or collected by or from a public Internet connected to the target hosts; and such behavioral information may be provided to a user (e.g., a cyber threat analyst, etc.). A threat indicator can include, for example, a name of malware, a verbose description of behaviors, a set of IP addresses/Domains/URL identifiers, a set of protocol/port identifiers and various contexts associated with a particular malware instance, and/or the like. The TIVM can receive the threat indicators and provide active and real-time verifications of the threat indicators before associating the threat indicators with Internet hosts for further threat processing. In this way, the TIVM can provide users such as cyber analysts with a more accurate and real-time view of those threats, and false alarms of cyber threats will be reduced.

Figure 1:
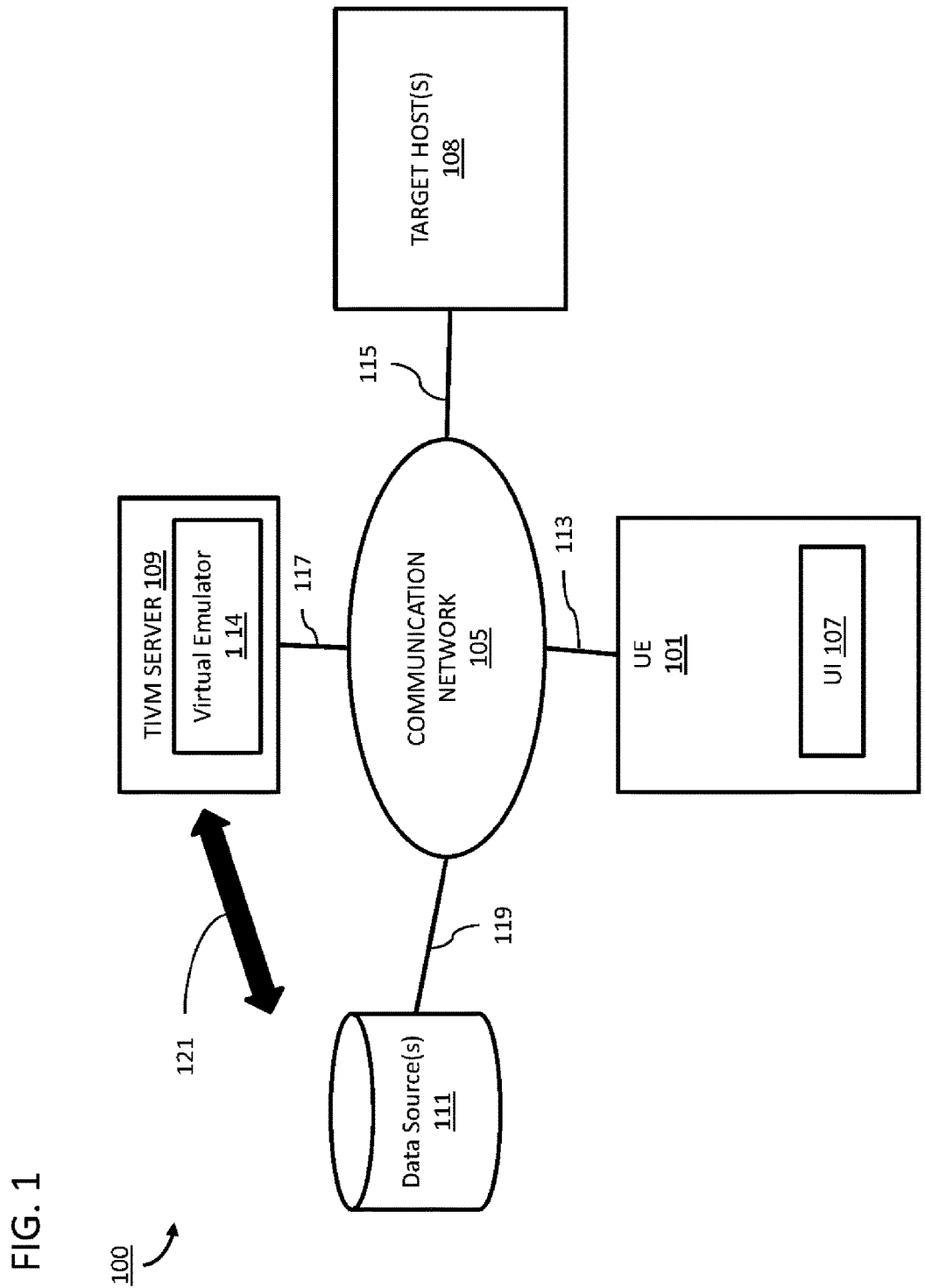
FIG. 1 provides a schematic block diagram of a communication network system in which TIVM aspects can be provided, according to an embodiment.

FIG. 1 provides a schematic block diagram of a communication network system in which TIVM aspects can be provided, according to an embodiment. A communication network system 100 can include one or more user devices or user equipments (UEs) 101, each equipped with at least a user interface (UI) 107; one or more TIVM servers 109; one or more data source(s) or databases 111; and one or more target hosts 108 (e.g., the infected computers, etc.). Any of the devices or platforms of the network system 100 can be equipped with local memory/storage spaces (not shown in FIG. 1). Furthermore, the devices and platforms of the network system 100 may have access to centralized or distributed memory/storage spaces (not shown in FIG. 1) through the communication network 105. Thus, FIG. 1 is merely an example illustrating the types of devices and platforms that can be included within a communication network system 100.

Communication network 105 can be any communication network, such as the Internet, configurable to allow the one or more UEs 101, the one or more TIVM servers 109, and the target host(s) 108 to communicate with communication network 105 and/or to each other through communication network 105. Communication network 105 can be any network or combination of networks capable of transmitting information (e.g., data and/or signals) and can include, for example, a telephone network, an Ethernet network, a fiber-optic network, a wireless network, and/or a cellular network.

In some instances, communication network 105 can include multiple networks operatively coupled to one another by, for example, network bridges, routers, switches and/or gateways. For example, the UEs 101 can be operatively coupled to a cellular network; and the target host(s) 108 can be operatively coupled to a fiber-optic network. The cellular network and fiber-optic network can each be operatively coupled to one another via one or more network bridges, routers, switches, and/or gateways such that the cellular network, the Ethernet network and the fiber-optic network are operatively coupled to form a communication network. Alternatively, the cellular network and fiber-optic network can each be operatively coupled to one another via one or more additional networks. For example, the cellular network and the fiber-optic network can each be operatively coupled to the Internet such that the cellular network, the fiber-optic network and the Internet are operatively coupled to form a communication network.

As illustrated in FIG. 1, UEs 101 are operatively coupled to communication network 105 via network connection(s) 113; target host(s) 108 are operatively coupled to communication network 105 via network connection(s) 115; TIVM servers 109 are operatively coupled to communication network 105 via network connection(s) 117; and data source(s) 111 are operatively coupled to communication network 105 via network connection(s) 119. Network connections 113, 115, 117, and 119 can be any appropriate network connection to operatively couple UEs 101, target host(s) 108, the TIVM servers 109, and the data source(s) 111. Furthermore, the TIVM server(s) 109 can have a direct connection to the data source(s) 111 via communication 121.

A network connection can be a wireless network connection such as, for example, a wireless fidelity ("Wi-Fi") or Wireless Local Area Network ("WLAN") connection, a Wireless Wide Area Network ("WWAN") connection, and/or a cellular connection. A network connection can be a wired connection such as, for example, an Ethernet connection, a Digital Subscription Line ("DSL") connection, a broadband coaxial connection, and/or a fiber-optic connection.

As mentioned above, in some instances, a communication network system 100 can include more than one UE 101, more than one TIVM server 109, and more than one data source 111. A UE 101, and/or a TIVM server 109, can be operatively coupled to the communication network 105 by heterogeneous network connections. For example, a first UE 101 can be operatively coupled to the communication network 105 by a WWAN network connection, another UE 101 can be operatively coupled to the communication network 105 by a DSL network connection, and a TIVM server 109 can be operatively coupled to the communication network 105 by a fiber-optic network connection.

The TIVM server(s) 109 each can be, for example, a web server, a remote server, and/or the like, configured to provide search capabilities to electronic devices, such as UEs 101. The UE 101 can be in communication with the TIVM server(s) 109 via the communication network 105. In one implementation, the TIVM server(s) 109 can be a remote server housed separately from the UE 101. For example, the UE 101 can receive a signal representing a report for active confirmation of a cyber threat indicator, from the TIVM server 109 via the communication links 113 and 117. In another implementation, the TIVM server(s) 109 can be integrated with the UE 101, where the report can be directly presented at the UI 107 on UE 101. The report of active confirmation can be generated at the TIVM server 109 by employing a virtual emulator 114 to access the target host(s) 108 so as to determine whether the target host 108 is infected by any malicious code or program. A detailed discussion of functional module(s) and data store(s) of the TIVM server 109 is provided in FIG. 2.

The UEs 101 can be any of a variety of electronic devices that can be operatively coupled to communication network 105. A UE 101 can be, for example, a personal computer, a tablet computer, a personal digital assistant (PDA), a cellular telephone, a portable/mobile internet device, television, kiosk display, display screens in vehicles, projection devices, laser display devices, digital display watches, digital display glasses and/or some other electronic communication device with audio and/or visual capabilities. A UE 101 can also be, for example, a television set, a streamer device, a set top box, or any other electronic device equipped with a display unit (a UI 107) and a network connection 113 that enables the device to run applications on an operating system. The UEs 101 each can include a web browser configured to access a webpage or website, for example, hosted on or accessible via the TIVM platform 103 over communication network 105. The UEs 101 can be, for example, configured to support, for example, Hyper Text Markup Language (HTML) using JavaScript. For example, the UEs 101 can include a web browser, such as, Firefox®, Safari®, Dolphin®, Opera®, Internet Explorer (IE)®, Chrome® and/or similar browsers. An Internet page or website can be accessed by a user of a web browser at a UE 101 by providing the web browser with a reference such as a uniform resource locator (URL), for example, of a webpage. For example, a user of a UE 101 can access a TIVM server 109 via a URL designated for the TIVM server 109. In some instances, UEs 101 each can include specialized software other than a browser for accessing a web server such as, for example, a TIVM server 109. Specialized software can be, for example, a specialized network-enabled application or program. In some instances, portions of a website accessible via a web server can be located in a local or remote memory space/data store accessible to the web server. A UE 101 can also include a display, monitor or user interface (UI) 107, a keyboard, various ports (e.g., a USB port), and other user interface features, such as, for example, touch screen controls, audio components, and/or video components (each not shown). For example, the UE 101 may be operated and/or accessed by a user (e.g., a cyber analyst, etc.) to obtain active confirmation report of a threat indicator.

Data source(s) or database(s) 111 can be distributed sources of data throughout the communication network system 100. A data source 111 can be at least one or more of a database, a data warehouse, a file, etc.

Figure 2:
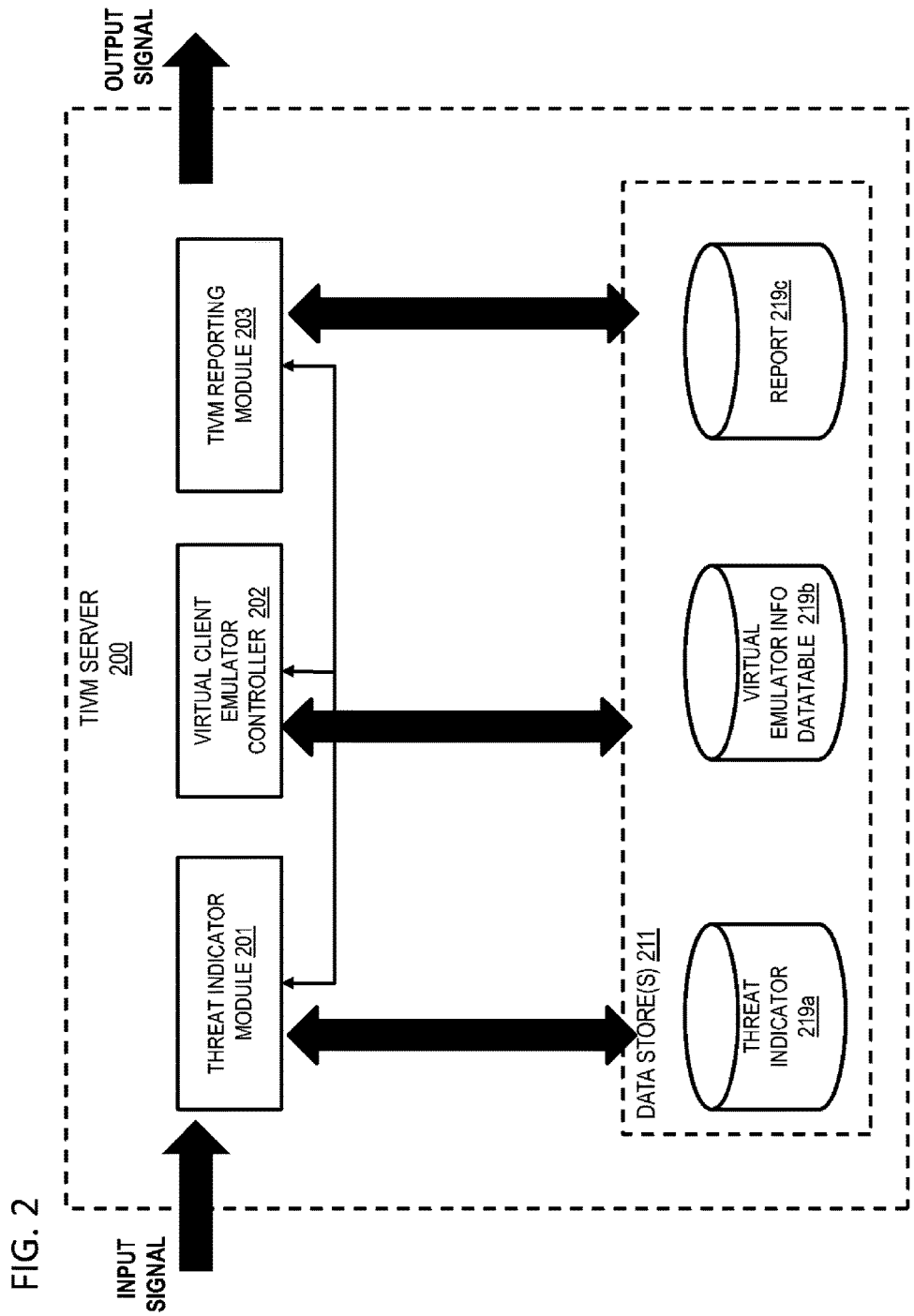
FIG. 2 is a schematic illustration of TIVM components and/or modules, according to an embodiment.

FIG. 2 is a schematic illustration of TIVM components and/or modules, according to an embodiment. The TIVM server 200 can be similar to the TIVM server 109 in FIG. 1. As shown in FIG. 2, a TIVM server 200 can include a threat indicator module 201, a virtual client emulator controller module 202, a TIVM reporting module 203, and/or the like. A data store(s) 211 can include a threat indicator data table 219a, virtual emulator information data table 219b, report data table 219c, and/or the like. Furthermore, the TIVM server 200 communicates with other devices of a communication network system (e.g., communication network system 100 of FIG. 1) via input signal 221 and output signal 223.

In various instances, the TIVM server 200 and its components can be located anywhere within a communication network system 100 such as that shown in FIG. 1 including, but not limited to, within the UEs 101, or in separate locations within the communication network system 100 of FIG. 1. The TIVM server 200 can also be provided as on-premise deployment, via private computation clouds, or be embedded into other software or bundled into devices by Original Equipment Manufacturers (OEMs).

As used herein, a module can be, for example, any assembly and/or set of operatively-coupled electrical components, and can include, for example, a memory, a processor, electrical traces, optical connectors, software (executing or to be executed in hardware) and/or the like. Furthermore, a module can be capable of performing one or more specific functions associated with the module, as discussed further below.

In some embodiments, the TIVM server 200 can provide an analytics platform as a Software as a Service (SaaS) such that, for example, the TIVM services are centrally hosted on the information cloud (not shown) for independent software vendors, system integrators, analytics consultants, enterprises, etc., to build multi-tenant business intelligence and embedded analytics solutions for external and internal customers and/or users, for example, by using a browser. The TIVM server 200 can enable users to mashup data from various sources for real-time ad-hoc analysis, build reports with rich visualizations and dynamic dashboards, and collaborate in-place among stakeholders to make informed decisions. The TIVM server 200 can provide capability of reducing data into smaller parts or views that can yield more information (e.g., slice and dice), drill downs and search on data. For example, a multi-dimensional data structure can be considered as a data cube and the act of picking a rectangular subset of a data cube by choosing a single value for one of its dimensions can define a new data cube with one fewer dimension (e.g., slice operation). Other operations can produce sub-cubes, for example, by allowing an analyst to pick specific values of multiple dimensions (e.g., dice operation). Furthermore, a drill down/up operation allows the user to navigate among levels of data ranging from the most summarized (up) to the most detailed (down).

In some instances, the TIVM server 200 can receive an input including a threat indicator sent from a data source (e.g., see 111 in FIG. 1, etc.) such as a host computer, and the e input signal 221 including the threat indicator may be processed at the threat indicator module 201; and the threat indicator can be stored at a threat indicator table 219a. The threat indicator input signal 221 may include a name of malware, or a verbose description of behaviors, a set of IP addresses/Domains/URL identifiers, a set of protocol/port identifiers and various context associated with a particular malware instance, and/or the like. Further detail of the threat indicator module 201 generating an active confirmation list based on the threat indicators is discussed in FIG. 4B and description below.

In response to obtaining the IP addresses/Domains/URL identifiers from the threat indicators, the virtual client emulator controller 202 may instantiate one or more client emulator(s) from a virtual emulator information table 219b to access the IP addresses/Domains/URL identifiers in order to verify the presence of malicious code, collects samples of that malicious code, and determine observable behaviors to increase the overall confidence and knowledge of the reported threat indicator. For example, a virtual client emulator can simulate a client terminal and/or a client operational module, such as a client application, a client operating system, a client operation, and/or the like, and send an access request to a threat source based on the IP address/Domain/URL identifier of the threat source, where the access request can be disguised as a request sent from a client terminal. The virtual emulator information table 219b can include data fields such as, but not limited to a virtual emulator identifier, a virtual emulator name, a virtual emulator compatible operating system, a virtual emulator threat type, and/or the like.

Further detail of the TIVM virtual client emulator controller 202 verifying a threat indicator is provided in FIG. 4C and description below. The reported data from the emulators may be integrated in a threat indicator confirmation report at the TIVM reporting module 203 to be stored.

In various instances, the output signal 223 may include a variety of data outputs, such as a threat indicator confirmation response (e.g., a confidence indicator of the received threat indicator) from a virtual client emulator, a report of the threat indicator from the report database 219c, and/or the like.

Figure 3A:
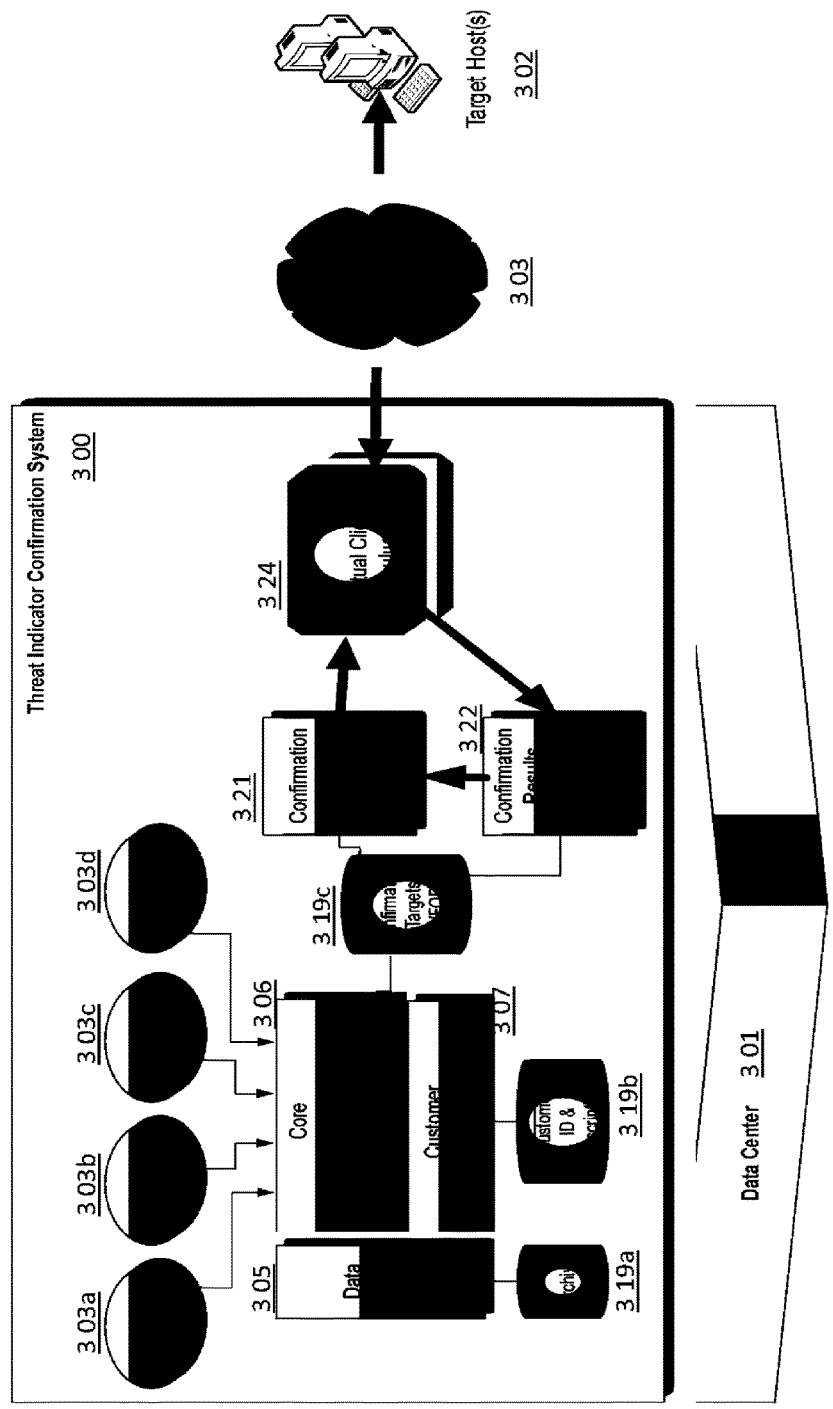
FIG. 3A is a schematic block diagram illustrating aspects of infrastructure of a threat indicator confirmation system, according to an embodiment.

FIG. 3A is a schematic block diagram illustrating aspects of infrastructure of a threat indicator confirmation system (e.g., a more detailed example illustration of the TIVM server 200 in FIG. 2), according to an embodiment. In one embodiment, the TIVM can include a threat indicator confirmation system 300 that processes a threat indicator received from intelligence feeds 303a-d, and verifies the threat indicator. For example, the threat indicator confirmation system 300 can aggregate a set of threat indicators related to malware and botnets.

The threat indicator confirmation system 300 can be built as part of a data center 301, which facilitates the data transmission between various functional modules within the threat indicator confirmation system 300, such as the data center management 305, a core intelligence processor 306, customer management and entitlement module 307, confirmation controller 321, confirmation results analyzer 322, virtual client emulators 324, and/or the like. The data center 301 may also facilitates exogenous data exchange, such as various intelligence feeds 303a-d to the core intelligence processor 306, access requests from a virtual client emulator 324 via the Internet 303 to the target host 302, and/or the like. Such data communications can be managed and archived by the data center management module 305 at an archive database 319a.

In one implementation, the core intelligence processor 306 can receive various intelligence feeds 303a-303d (e.g., from an internal or external intelligence source, etc.) so that the core intelligence processor 306 can identify the confirmation targets and/or threat indicators. The core intelligence processor 306 can then identify the IP addresses and/or the fully qualified domain name (FQDN) of the target hosts 302 from database 319c, e.g., by forming a query on the database 319c based on a URL in the threat indicator, etc. The IP/FQDN information is passed on to the confirmation controller module 321, which manages the virtual client emulators 324, to access a target host(s) 302 via the Internet 303. As discussed at 202 in FIG. 2, a virtual client emulator can simulate a client terminal and/or client modules to send an access request to the target host(2) 302. In this way, the target hosts 302 can interact with the virtual client emulator 324 as if the virtual client emulator 324 is a real client terminal/system, and can send malicious code to the virtual client emulator 324 when the target host(s) 302 includes a cyber threat hazard. For example, the virtual client emulator 324 can simulate a web browser running on a client computer, and can generate a simulated Hypertext Transfer Protocol (HTTP) request containing an IP address, a session identifier, a browser identifier, and/or the like to the target host(s) 302, which can be a web server. When the target host(s) 320, e.g., the web server, is contaminated with malicious cyber hazards, the target host(s) 302 may respond to the HTTP request with a response (e.g., a connection approval, etc.) but including malicious code, and such malicious code can be captured by the virtual client emulator 342. In other examples, the virtual client emulator 324 can simulate an electronic mail component, an online gaming component, an instant messaging component, and/or the like. The confirmation results obtained by the virtual client emulator(s) 324 may be processed by the confirmation results analyzer 322.

In one implementation, the threat indicator confirmation system 300 may provide threat verification service to a customer via the customer management module 307, which manages customer profiles such as customer identifications and subscriptions information at the database 319b.

Figure 3B:
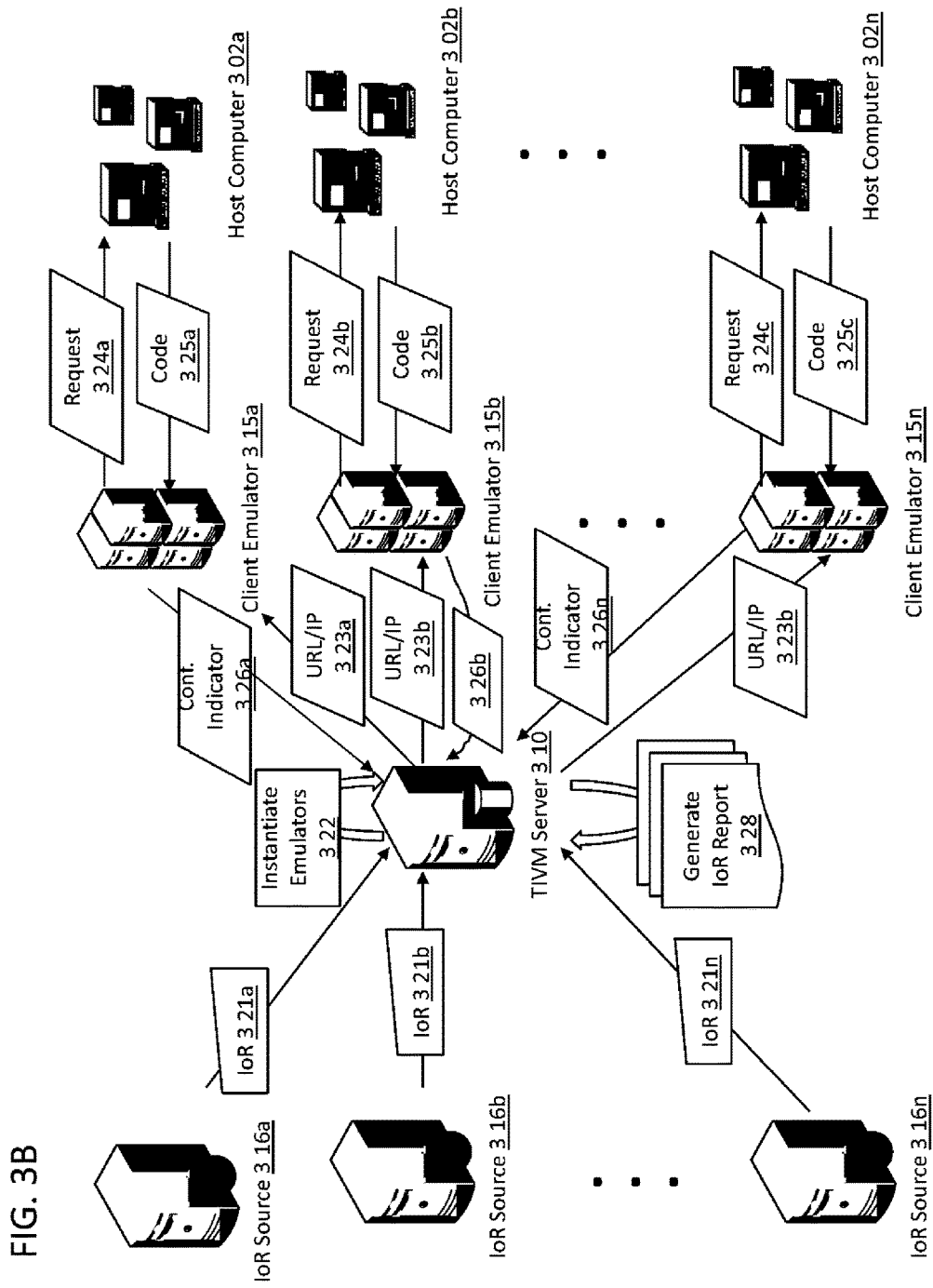
FIG. 3B is an example data flow diagram illustrating aspects of interactive data flows between a TIVM server and the affiliated entities, according to an embodiment.

FIG. 3B is an example data flow diagram illustrating aspects of interactive data flows between a TIVM server (e.g., 109 in FIG. 1) and the related entities, according to an embodiment. The TIVM server 310 could be similar to the TIVM server 109 in FIG. 1, and/or the threat indicator confirmation system 300 in FIG. 3A. As shown in FIG. 3B, the TIVM server 310 can receive various threat indicators (IoR) 321a-n from IoR sources 316a-n. For example, the IoR sources may include a cyber risk monitoring entity, which may be either an automatic system or a manual monitoring mechanism (e.g., a person may manually submit a threat indicator, etc.), and/or the like. The TIVM server 310 can instantiate virtual client emulators based on the threat indicator type at 322. For example, a virtual client emulator can correspond to a type of threat indicator, based on criticality, classification, threat indicator source, and/or the like characteristics of the threat indicator. Alternatively, a virtual client emulator can correspond to multiple types of threat indicators. In one implementation, the client emulators may be housed with the TIVM server 310, e.g., as shown at 324 in FIG. 3A. Or alternatively, the client emulators 315a-n may be distributed emulators that are housed separately from the TIVM server 310, e.g., as shown at 315a-n in FIG. 3B.

In one implementation, a confirmation controller module (e.g., see 321 in FIG. 3A) within the TIVM server 310 (or the threat indicator confirmation system 300 in FIG. 3A) may distribute the set of source IP addresses or URL identifiers to one or more (virtual) client emulators 315a-n. The client emulators 315a-n then connect to hosts computers 302a-n (e.g., the suspected infected computers/devices, etc.), such as compute devices associated with the IP addresses or URLs referenced by the threat indicator, continuously, periodically, intermittently or on an on-demand basis, e.g., by sending access requests 324a-n to the hosts computers 302a-n. By obtaining a response from the host computers 302a-n, each client emulator 315a-n verifies whether any malicious code is present in the response or active on the host computer; and if there is any, the client emulator 315a-n collect samples of that malicious code 325a-n from the received responses or determines observed behavior of the malware running on the host computer. The virtual client emulator 315a-n may then determine a confidence level of the threat indicator (e.g., regarding whether the threat indicator indeed includes a malicious attack, etc.) and send a confidence indicator 326a-n to the TIVM server 310.

Alternatively, the client emulators 315a-n report back on the collected malicious code 325a-n to the TIVM server 310, which may in turn determine whether a malicious attack is indicated with the threat indicator.

The reporting module (e.g., 203 in FIG. 2) can generate a threat indicator confirmation report at 328. Both negative and positive connection and behavior information (e.g., whether the threat indicator corresponds to an actual risk to cyber security, etc.) is included in the threat indicator confirmation report as part of the confirmation data, and is included in the confirmation report. For example, the confirmation report can include data fields such as, but not limited to a report name, a report timestamp, a threat indicator identifier, a threat indicator timestamp, a threat IP address, threat FQDN, threat malware type, threat Botnet type, virtual emulator history, a confidence level/indicator, and/or the like.

Figure 4A:
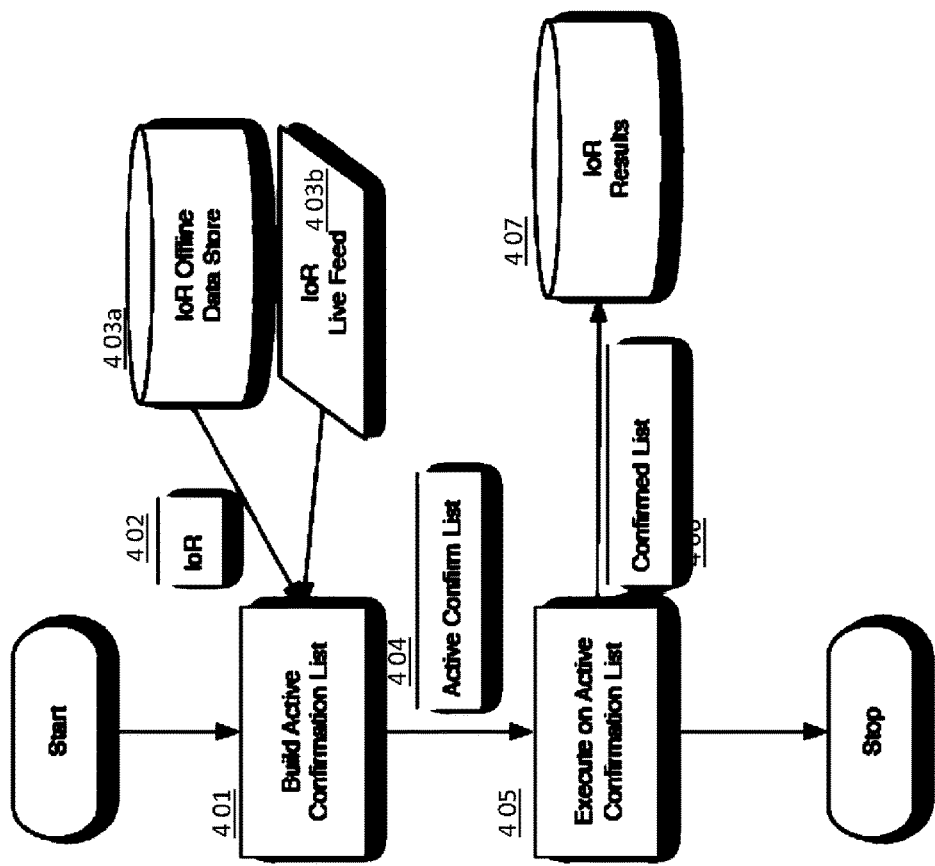
FIGS. 4A-4C provide example logic flow diagrams illustrating aspects of threat indicator confirmation, according to one embodiment.
Figure 4B:
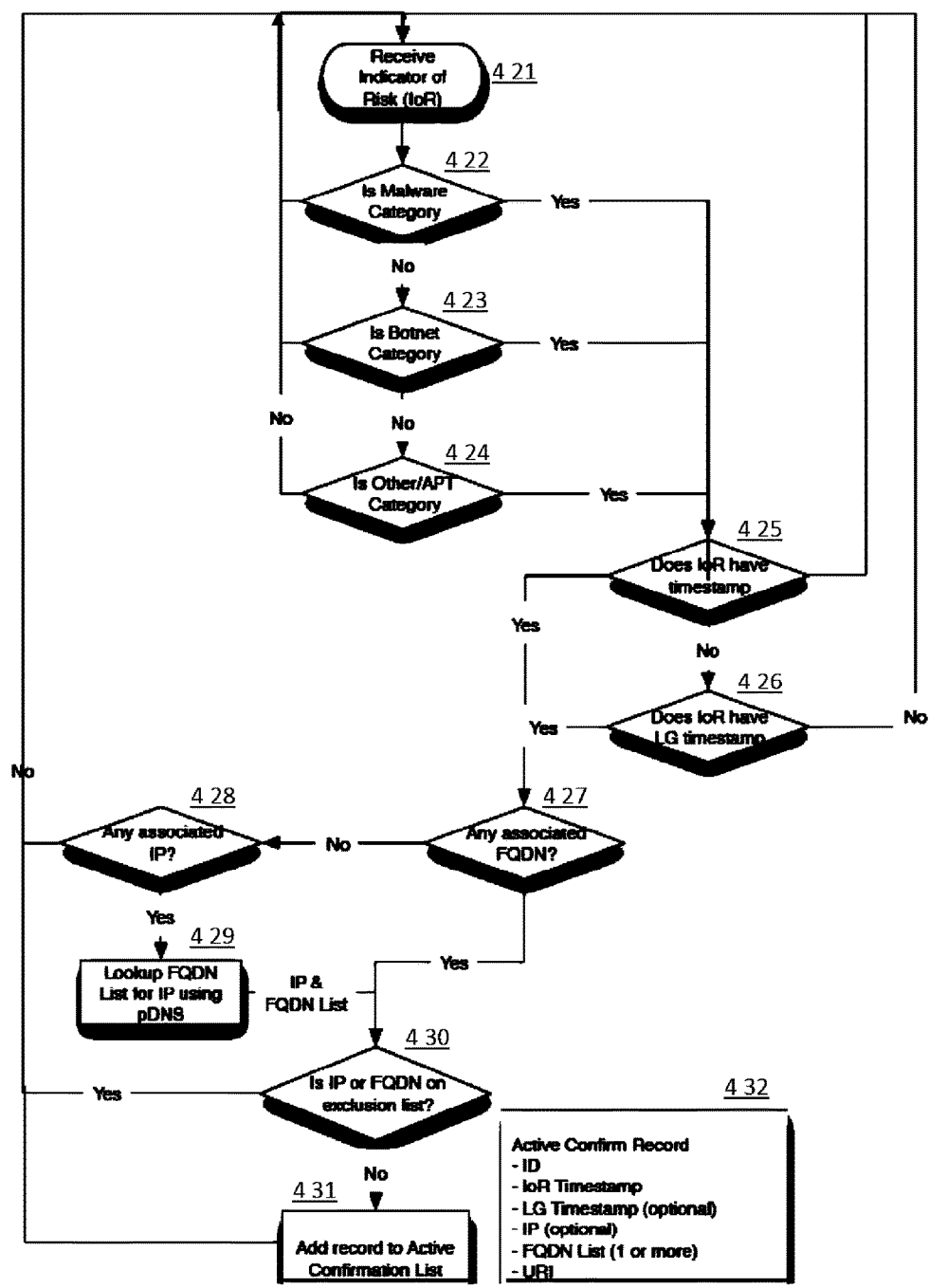
Figure 4C:
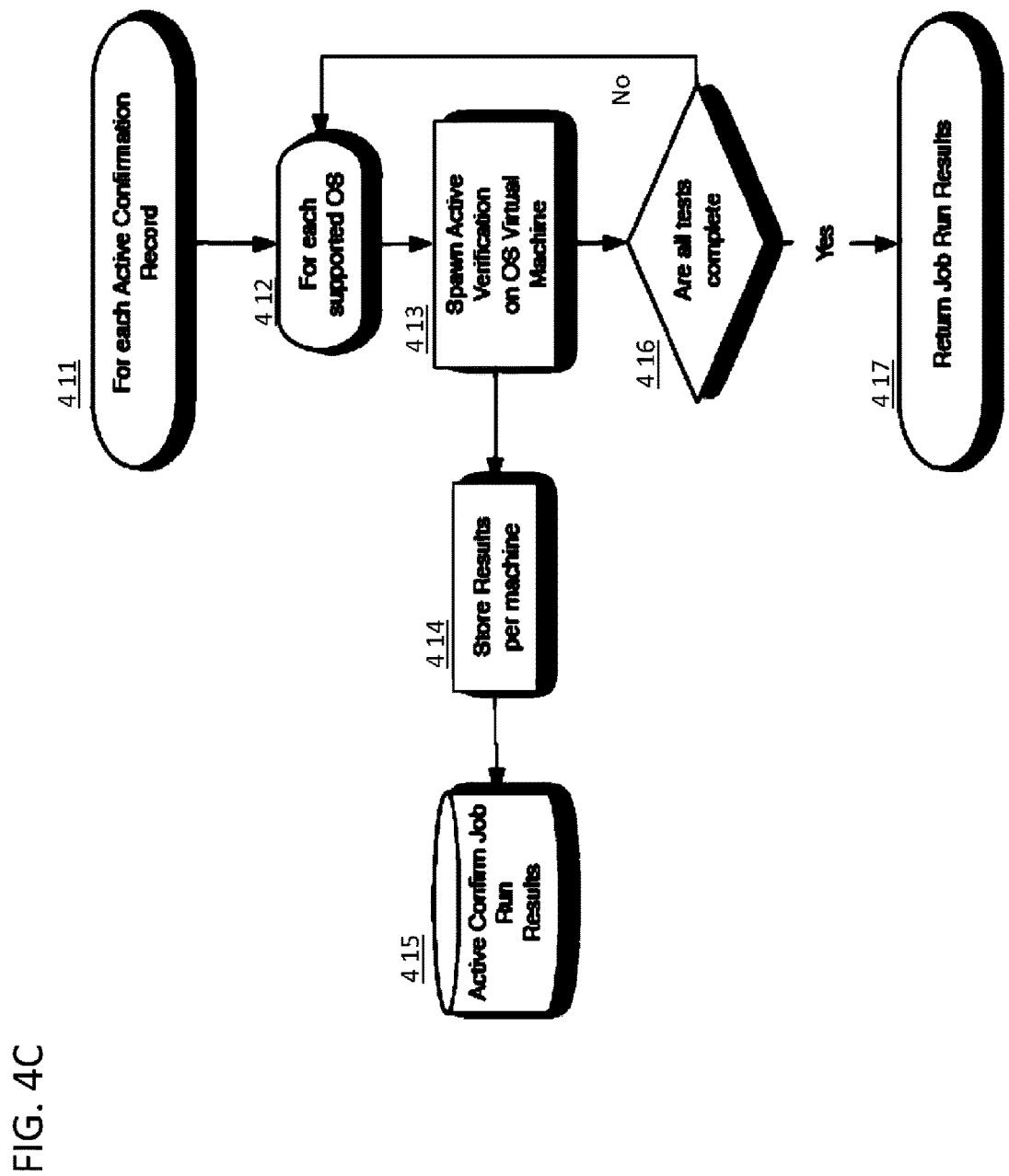

FIGS. 4A-4C provide example logic flow diagrams illustrating aspects of threat indicator confirmation (e.g., functions performed by the threat indicator confirmation system 300 in FIG. 3A), according to one embodiment. With reference to FIG. 4A, the TIVM starts with building an active confirmation list of threat indicators to be verified, e.g., at 401. For example, the TIVM can receive a live feed of threat indicator 403b in real-time, and add the received threat indicator to the active confirmation list. In another example, the TIVM may process threat indicators offline in a batch, e.g., by obtaining previously received and stored threat indicators (IoRs 402) from a data store 403a.

The active confirmation list 404 can be updated constantly, periodically, intermittently, and/or based on an on-demand basis. The VITM can execute the active confirmation list at 405 (as further discussed in FIG. 4C) to obtain a list of confirmation results 406, which can be saved at a threat indicator results data store 407.

FIG. 4B is a logic flow diagram illustrating aspects of building an active confirmation list (e.g., 401 in FIG. 4A), according to an embodiment. The TIVM can build an active confirmation list based on received threat indicators, for example, by the threat indicator module 201 in FIG. 2. As shown in FIG. 4B, upon receiving a threat indicator (or Indicator of Risk (IoR)) at 421, the TIVM can determine a category of the indicator, e.g., whether it belongs to the malware category at 422; if not, whether it belongs to the Botnet category at 423; if not, whether it belongs to other advanced persistent threat (APT) categories at 424, and/or the like. If the threat indicator belongs to any of the malware, Botnet or APT categories, the TIVM can continue to determine whether the threat indicator has a timestamp at 425. If no timestamp associated with the threat indicator, the TIVM may determine whether the threat indicator has a TIVM timestamp at 426 (e.g., the timestamp added to the indicator when received at the TIVM threat indicator module 201 in FIG. 2).

If the threat indicator has any of the timestamps at 425 or 426, the TIVM can proceed to determine whether the threat indicator has any associated FQDN at 427. If no timestamp is associated with the threat indicator, the TIVM may not be able to process the threat indicator, and can move on to the next threat indicator at 421.

At 427, if no FQDN is found, the TIVM can determine whether the threat indicator has associated IP address at 428. If neither FQDN is found at 427, nor is any IP address found at 428, the TIVM may not be able to process the threat indicator, and can move on to the next threat indicator at 421. Otherwise, when an IP address is associated with the threat indicator 428, the TIVM can query a lookup list of FQDN for the IP address using a Power Domain Name Server (pDNS) at 429, and return the query result of an IP/FQDN list to 430.

Returning to 427, when FQDN is associated with the threat indicator, the TIVM can optionally proceed at 430, to determine whether the IP address or FQDN is on an exclusion list, e.g., whether the IP or FQDN has been flagged or alerted in previous attack records. If yes, the threat has been confirmed at 430, and the TIVM can proceed to process the next threat indicator at 421. If not, the TIVM may add the threat indicator record to an active confirmation list at 431 for further verification, and the TIVM may re-start at 421 to process the next threat indicator. For example, an example data structure of the active confirmation record is provided at 432, including a record identifier, a threat indicator timestamp (determined at 425), an optional TIVM timestamp (determined at 426), an optional IP address (determined at 428), a FQDN list (determined at 427/429), a Uniform Resource Identifier (URI), and/or the like.

FIG. 4C is a logic flow diagram illustrating aspects of executing an active confirmation list (e.g., 405 in FIG. 4A), according to an embodiment. As shown in FIG. 4C, for each active confirmation record (e.g., obtained via 403*a-b* in FIG. 4A) at 411, and each supported operating system (OS) 412, the TIVM instantiates an OS virtual machine and produce(s) an active verification request at 413, e.g., by instantiating a virtual client emulator and facilitating the virtual client emulator to access the IP/URL address of the threat source (see 342*a-n*, 325*a-n* in FIG. 3B). For example, the TIVM can obtain returned results from the OS virtual machine at 414, and store such results at an active confirmation job running results database 415.

The TIVM can also determine whether all the tests are complete at 416, e.g., by examining whether all the active confirmation records on the active formation list have been verified. If yes, the TIVM can return the job running results 417 to produce a confirmation report, e.g., at the reporting module 203 in FIG. 2. Otherwise, the TIVM may continue to examine the remaining active confirmation record at 412.

It is intended that the systems and methods described herein can be performed by software (executed on hardware), hardware, or a combination thereof. Hardware modules can include, for example, a general-purpose processor, a field programmable gates array (FPGA), and/or an application specific integrated circuit (ASIC). Software modules (executed on hardware) can be expressed in a variety of software languages (e.g., computer code), including C, C++, Java™, Ruby, Python, JavaScript, Perl, PHP, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. A non-transitory processor-readable medium storing code representing processor-executable instructions, the code comprising code to cause a processor to:
   receive information related to a cyber threat indicator of a type, the cyber threat indicator including identifying information of a target host and information related to malware behavior;
   instantiate a virtual client emulator selected based on the type of the cyber threat indicator in response to receiving the information related to the cyber threat indicator, the virtual client emulator configured to emulate a client of the target host;
   send an access request from the virtual client emulator to the target host based on the identifying information;
   receive a response from the target host based on the access request; and
   send a signal to a compute device based on the response such that the compute device performs a cyber threat mitigation action on compute devices within control of the compute device and associated with communications from the target host.

2. The non-transitory processor-readable medium of claim 1, wherein the code to receive the response includes code to receive the response based on interaction between the virtual client emulator and the target host.

3. The non-transitory processor-readable medium of claim 1, wherein:
   the code to receive the response includes (1) code to receive malicious code from the target host in response to the access request and (2) code to receive information on the target host including retrievable malware instances and executable components from the target host.

4. The non-transitory processor-readable medium of claim 1, wherein the code further includes code to:
   generate a cyber threat confidence indicator based on the response, the cyber threat confidence indicator indicating at least one of existence of malware at the target host or malware behavior at the target host,
   the code to send the signal including code to send the signal representing a cyber threat indicator confirmation report that includes the cyber threat confidence indicator.

5. The non-transitory processor-readable medium of claim 1, wherein:

the code to receive the response includes (1) code to receive malicious code from the target host in response to the access request and (2) code to receive information on the target host including retrieve malware instances and executable components from the target host, the code further includes code to:
generate a cyber threat confidence indicator based on the malicious code, the information on the retrievable malware instances, and the executable component, the cyber threat confidence indicator indicating at least one of existence of malware at the target host or malware behavior at the target host, the code to send the signal including code to send the signal representing a cyber threat indicator confirmation report that includes the cyber threat confidence indicator.

6. The non-transitory processor-readable medium of claim 1, wherein the client is a first client, the virtual client emulator is a first virtual client emulator, the cyber threat indicator is a first cyber threat indicator, the code further includes code to:
receive information related to a second cyber threat indicator of a type different than the type of the first cyber threat indicator, the second cyber threat indicator including identifying information related to malware behavior; and
instantiate a second virtual client emulator selected based on the type of the second cyber threat indicator in response to receiving the information related to the second cyber threat indicator, the second virtual client emulator configured to emulate a second client different from the first client.

7. The non-transitory processor-readable medium of claim 6, wherein the code to instantiate the first virtual client emulator and the code to instantiate the second virtual client emulator are implemented at a virtual client emulator controller of the processor.

8. The non-transitory processor-readable medium of claim 1, wherein the access request is disguised as a request sent from a client of the target host.

9. The non-transitory processor-readable medium of claim 1, wherein the access request is disguised as a request sent from a client of the target host that is at least one of a client terminal, a client application, a client operating system or a client operation.

10. A non-transitory processor-readable medium storing code representing processor-executable instructions, the code comprising code to cause a processor to:
receive information related to a cyber threat indicator of a type, the cyber threat indicator including identifying information of a target host and information related to malware behavior;
instantiate a virtual client emulator selected based on the type of the cyber threat indicator in response to receiving the information related to the cyber threat indicator;
send an access request from the virtual client emulator to the target host based on the identifying information;
receive a response from the target host based on the access request and based on an interaction that is between the virtual client emulator and the target host and that includes verifying presence of malicious code at the target host; and
send a signal to a compute device based on the response such that the compute device performs a cyber threat mitigation action on compute devices within control of the compute device and associated with communications with the target host.

11. The non-transitory processor-readable medium of claim 10, wherein the interaction includes receiving, from the target host and in response to the access request, at least one of malicious code, information on retrievable malware instances, or executable components.

12. The non-transitory processor-readable medium of claim 10, wherein the code further includes code to:
generate a cyber threat confidence indicator based on the response, the cyber threat confidence indicator indicating at least one of existence of malware at the target host or malware behavior at the target host, the code to send the signal including code to send the signal representing a cyber threat indicator confirmation report that includes the cyber threat confidence indicator.

13. The non-transitory processor-readable medium of claim 10, wherein:
the interaction includes receiving, from the target host and in response to the access request, at least one of malicious code, information on retrievable malware instances, or executable components,
the code further includes code to:
generate a cyber threat confidence indicator based on the at least one of malicious code, information on retrievable malware instances, or executable components, the cyber threat confidence indicator indicating at least one of existence of malware at the target host or malware behavior at the target host,
the code to send the signal including code to send the signal representing a cyber threat indicator confirmation report that includes the cyber threat confidence indicator.

14. The non-transitory processor-readable medium of claim 10, wherein the client is a first client, the virtual client emulator is a first virtual client emulator, the cyber threat indicator is a first cyber threat indicator, the code further includes code to:
receive information related to a second cyber threat indicator of a type different than the type of the first cyber threat indicator, the second cyber threat indicator including identifying information related to malware behavior; and
instantiate a second virtual client emulator selected based on the type of the second cyber threat indicator in response to receiving the information related to the second cyber threat indicator, the second virtual client emulator configured to emulate a second client different from the first client.

15. The non-transitory processor-readable medium of claim 14, wherein the code to instantiate the first virtual client emulator and the code to instantiate the second virtual client emulator are implemented at a virtual client emulator controller of the processor.

16. The non-transitory processor-readable medium of claim 10, wherein the access request is disguised as a request sent from a client of the target host that is at least one of a client terminal, a client application, a client operating system or a client operation.

17. A non-transitory processor-readable medium storing code representing processor-executable instructions, the code comprising code to cause a processor to:

receive information related to a cyber threat indicator of a type, the cyber threat indicator including identifying information of a target host and information related to malware behavior;

instantiate a virtual client emulator selected based on the type of the cyber threat indicator in response to receiving the information related to the cyber threat indicator;

send an access request from the virtual client emulator to the target host based on the identifying information, the access request being disguised as a request sent from a client of the target host;

receive a malicious code from the target host in response to the access request; and send a signal to a compute device based on receiving the malicious code such that the compute device performs a cyber threat mitigation action on compute devices within control of the compute device and associated with communications from the target host.

18. The non-transitory processor-readable medium of claim 17, wherein the code to receive the malicious code includes code to receive the malicious code based on interaction between the virtual client emulator and the target host.

19. The non-transitory processor-readable medium of claim 17, wherein the code to receive the malicious code includes code to receive information on the target host including retrievable malware instances and executable components from the target host.

20. The non-transitory processor-readable medium of claim 17, wherein the code further includes code to:

generate a cyber threat confidence indicator based on receiving the malicious code, the cyber threat confidence indicator indicating at least one of existence of malware at the target host or malware behavior at the target host, the code to send the signal including code to send the signal representing a cyber threat indicator confirmation report that includes the cyber threat confidence indicator.

21. The non-transitory processor-readable medium of claim 17, wherein:

the code to receive the malicious code includes (1) code to receive malicious code from the target host in response to the access request and (2) code to receive information on the target host including retrievable malware instances and executable components from the target host, the code further includes code to:

generate a cyber threat confidence indicator based on receiving the malicious code, the malware instances and executable components, the cyber threat confidence indicator indicating at least one of existence of malware at the target host or malware behavior at the target host, the code to send the signal including code to send the signal representing a cyber threat indicator confirmation report that includes the cyber threat confidence indicator.

22. The non-transitory processor-readable medium of claim 17, wherein the client is a first client, the virtual client emulator is a first virtual client emulator, the cyber threat indicator is a first cyber threat indicator, the code further includes code to:

receive information related to a second cyber threat indicator of a type different than the type of the first cyber threat indicator, the second cyber threat indicator including identifying information related to malware behavior; and instantiate a second virtual client emulator selected based on the type of the second cyber threat indicator in response to receiving the information related to the second cyber threat indicator, the second virtual client emulator configured to emulate a second client different from the first client.

23. The non-transitory processor-readable medium of claim 22, wherein the code to instantiate the first virtual client emulator and the code to instantiate the second virtual client emulator are implemented at a virtual client emulator controller of the processor.

* * * * *